US011321866B2

(12) United States Patent
Kim et al.

(10) Patent No.: US 11,321,866 B2
(45) Date of Patent: May 3, 2022

(54) APPROACH PHOTOGRAPHING DEVICE AND METHOD FOR CONTROLLING THE SAME

(71) Applicant: LG ELECTRONICS INC., Seoul (KR)

(72) Inventors: Taehyun Kim, Seoul (KR); Ji Chan Maeng, Seoul (KR)

(73) Assignee: LG ELECTRONICS INC., Seoul (KR)

(*) Notice: Subject to any disclaimer, the term of this patent is extended or adjusted under 35 U.S.C. 154(b) by 88 days.

(21) Appl. No.: 16/842,493

(22) Filed: Apr. 7, 2020

(65) Prior Publication Data
US 2021/0209787 A1 Jul. 8, 2021

(30) Foreign Application Priority Data

Jan. 2, 2020 (KR) .................. 10-2020-0000277

(51) Int. Cl.
| | |
|---|---|
| *G06K 9/00* | (2006.01) |
| *G06T 7/70* | (2017.01) |
| *H04R 1/40* | (2006.01) |
| *H04R 3/00* | (2006.01) |
| *G06K 9/62* | (2022.01) |
| *G06N 3/08* | (2006.01) |
| *G06T 7/20* | (2017.01) |

(52) U.S. Cl.
CPC ............. *G06T 7/70* (2017.01); *G06K 9/6217* (2013.01); *G06K 9/6267* (2013.01); *G06N 3/08* (2013.01); *G06T 7/20* (2013.01); *H04R 1/406* (2013.01); *H04R 3/005* (2013.01); *G06T 2207/20084* (2013.01)

(58) Field of Classification Search
CPC .......................... G06K 9/6217; G06K 9/6267
USPC ...................................................... 382/103
See application file for complete search history.

(56) References Cited

U.S. PATENT DOCUMENTS

| | | | | |
|---|---|---|---|---|
| 10,721,521 B1* | 7/2020 | Robinson | ........... | H04N 21/8106 |
| 2004/0267521 A1* | 12/2004 | Cutler | ..................... | G10L 25/78 |
| | | | | 704/202 |
| 2011/0082690 A1* | 4/2011 | Togami | .................. | H04R 1/406 |
| | | | | 704/201 |
| 2014/0351078 A1* | 11/2014 | Kaplan | .............. | G06Q 30/0631 |
| | | | | 705/26.7 |
| 2015/0046157 A1* | 2/2015 | Wolff | ..................... | G10L 15/28 |
| | | | | 704/231 |
| 2016/0224869 A1* | 8/2016 | Clark-Polner | ......... | G06Q 50/00 |
| 2017/0025121 A1* | 1/2017 | Tang | ....................... | G10L 17/06 |

(Continued)

FOREIGN PATENT DOCUMENTS

| | | |
|---|---|---|
| KR | 10-0835376 B1 | 6/2008 |
| KR | 10-2014-0000585 A | 1/2014 |

*Primary Examiner* — Hadi Akhavannik
(74) *Attorney, Agent, or Firm* — Birch, Stewart, Kolasch & Birch, LLP

(57) ABSTRACT

A method of controlling audio collection for an image capturing device can include receiving image data from an image capturing device; recognizing one or more objects from the image data; determining a first object having a possibility of generating audio among the one or more objects; and collecting audio from the first object by moving a microphone beamforming direction of the image capturing device to be directed toward the first object in response to a determination that the first object is an object having a possibility of generating audio.

16 Claims, 9 Drawing Sheets

(56) References Cited

U.S. PATENT DOCUMENTS

2018/0074782 A1* 3/2018 Mcgibney ............ G10L 21/034
2018/0366139 A1* 12/2018 Bowden ............ G06K 9/00805

* cited by examiner

APPROACH PHOTOGRAPHING DEVICE AND METHOD FOR CONTROLLING THE SAME

CROSS-REFERENCE TO RELATED APPLICATION

This present application claims the benefit of priority to Korean Patent Application No. 10-2020-0000277, entitled "APPROACH PHOTOGRAPHING DEVICE AND METHOD FOR CONTROLLING THE SAME," filed on Jan. 2, 2020, in the Republic of Korea, the entirety of this application is incorporated herein by reference into the present application.

BACKGROUND

1. Technical Field

The present disclosure relates to an image capturing device capable of improving accuracy of audio collection by recognizing an object in which audio is generated and moving a microphone beamforming direction to be directed toward the recognized object, and a method of controlling the image capturing device.

2. Description of Related Art

The following description is only for the purpose of providing background information related to embodiments of the present disclosure, and the contents to be described do not necessarily constitute related art.

A mobile terminal may be configured to perform various functions. Examples of the various functions include data and voice communication functions, taking pictures or videos through a camera, storing audio, playing music files through a speaker system, and displaying images or videos. Some mobile terminals include additional functionality for games, while others are implemented as multimedia devices. Moreover, recent mobile terminals can receive broadcast or multicast signals to allow users to watch videos or television programs.

In addition, the mobile terminal provides various functions for capturing an image of a subject using a camera. A user manipulates control options of the camera to enlarge an image around a specific subject, adjust the focus of the image manually and/or automatically, or capture a desired image by using face recognition.

For example, the user can selectively capture images using a front or rear camera of the mobile terminal according to the position of the subject, and in particular, the image capturing mode (portrait mode or landscape mode) can be changed depending on the scene. In addition, the user may selectively zoom in or refocus on a specific area of a screen even during playback.

When capturing an image of a subject or scene of interest using these various image capturing techniques, the voice or sound generated by the subject is captured and stored by a microphone array. However, in the related art, not only is the sound generated by the subject captured, but the sound and noise of the surroundings are also captured. In order to address this issue, in existing technology, a target of interest or a specific area on a screen is manually pointed by a touch or a laser pointer, to selectively capture the sound of the pointed object or area.

However, the existing sound capturing method by a manual pointing method has a limitation in that the sound does not coincide with the image, due to only the sound of a specific subject or area being captured without interlocking with the captured image. For example, there is an inconvenience in that, when zooming in/out in a video, a visible subject or area is changed, and thus the pointing position should be manually changed every time.

In this regard, according to the technology disclosed in Korean Patent Application Publication No. 10-2014-0000585, entitled "Mobile terminal and audio zooming method thereof," when capturing an image of a subject, if an event occurs that changes the shooting position, range, or image capturing mode of the subject, the technology enables the sound of the subject to be captured by automatically adjusting the range of the sound by changing the angle of the sound according to the event.

In the above document, a technology capable of optimally capturing the sound or voice of a subject of interest by automatically linking the position and size of the subject to which the user has zoomed in or focused on to be directed toward the position of the subject or optimize the sound-capturing range is disclosed. However, in the above document, there is a limitation in that a technology for recognizing an object making a sound in an image and setting a beam forming direction of a microphone in a corresponding object direction is not described.

In addition, Korean Patent Registration No. 10-0835376 relates to a method for capturing video of a mobile communication terminal, and discloses a technology that allows a user to control video and audio input while shooting a video so that unwanted image or sound is not included in the video.

The above document describes a technology of respectively controlling the input of video and audio while capturing images, but faces a limitation in achieving a technology of recognizing an object emitting a sound in an image and setting a beam forming direction of a microphone to be directed toward the object.

In order to overcome the above limitations, it is necessary to provide an image capturing device for recognizing an object that makes a sound in an image and setting a microphone direction to be directed toward the object in which a sound is generated.

The background art described above may be technical information retained by the present inventors in order to derive the present disclosure or acquired by the present inventors along the process of deriving the present disclosure, and thus is not necessarily a known art disclosed to the general public before the filing of the present application.

SUMMARY OF THE INVENTION

An aspect of the present disclosure is to recognize an object making a sound in an image and set a beamforming direction of a microphone to be directed toward the object making a sound.

Another aspect of the present disclosure is to set a beamforming direction of a microphone such that audio of objects having a high probability of generating audio are mainly captured, by minimizing the capture of noise by setting only objects having a probability of generating audio above a predetermined threshold to be subjects of audio zoom-in.

Aspects of the present disclosure are not limited to the above-mentioned aspects, and other aspects and advantages of the present disclosure, which are not mentioned, will be understood through the following description, and will become apparent from the embodiments of the present disclosure. It is also to be understood that the aspects of the present disclosure may be realized by means and combinations thereof set forth in claims.

An audio control method of an image capturing device according to an embodiment of the present disclosure may include receiving image data from an image capturing device, recognizing one or more objects from the image data, determining a first object having a possibility of generating audio among the one or more objects, and collecting audio from the first object by moving a microphone beamforming direction of the image capturing device to be directed toward the first object in response to a determination that the first object is an object having a possibility of generating audio.

As such, an object generating a sound in an image may be recognized, and a microphone beamforming direction may be set to be directed toward the recognized object.

Further, an image capturing device for controlling audio of the present disclosure may include one or more processors and a memory connected to the one or more processors.

When executed by the one or more processors, the memory according to this embodiment of the present disclosure may store one or more instructions configured to cause the one or more processors to receive image data from an image capturing device, recognize one or more objects from the image data, determine a first object having a possibility of generating audio among the one or more objects, and collecting audio from the first object by moving a microphone beamforming direction of the image capturing device to be directed toward the first object in response to a determination that the first object is an object having a possibility of generating audio.

As such, audio of objects having a high probability of generating audio may be mainly captured, by minimizing the capture of noise by setting only objects having a probability of generating audio above a predetermined threshold to be subjects of audio zoom-in.

In addition, an audio control method of an image capturing device according to an embodiment of the present disclosure may include receiving image data from an image capturing device, recognizing one or more objects from the image data, determining a first object having a possibility of generating audio among the one or more objects and collecting audio from the first object by moving a microphone beamforming direction of the image capturing device to be directed toward the first object in response to a determination that the first object is an object having a possibility of generating audio.

Other aspects and features than those described above will become apparent from the following drawings, claims, and detailed description of the present disclosure.

According to embodiments of the present disclosure, when desiring to acquire audio of an object which has been zoomed in on during image capturing, by selecting an object with a high probability of generating audio and moving the microphone beamforming direction toward the object with a high probability of generating audio, it is possible to accurately capture of the sound of the object with a high probability of generating audio.

In addition, even if the position where the zoom-in is performed does not match the direction of the object where the sound is generated while capturing images, the sound collection of an object with a high probability of generating audio can be performed.

In addition, even when there are a plurality of objects having a high probability of generating sound, as the audio of each object is captured by using the plurality of microphones included in the image capturing device, the capture of the audio generated in the plurality of objects may be performed without omission.

The effects of the present disclosure are not limited to those mentioned above, and other effects not mentioned can be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
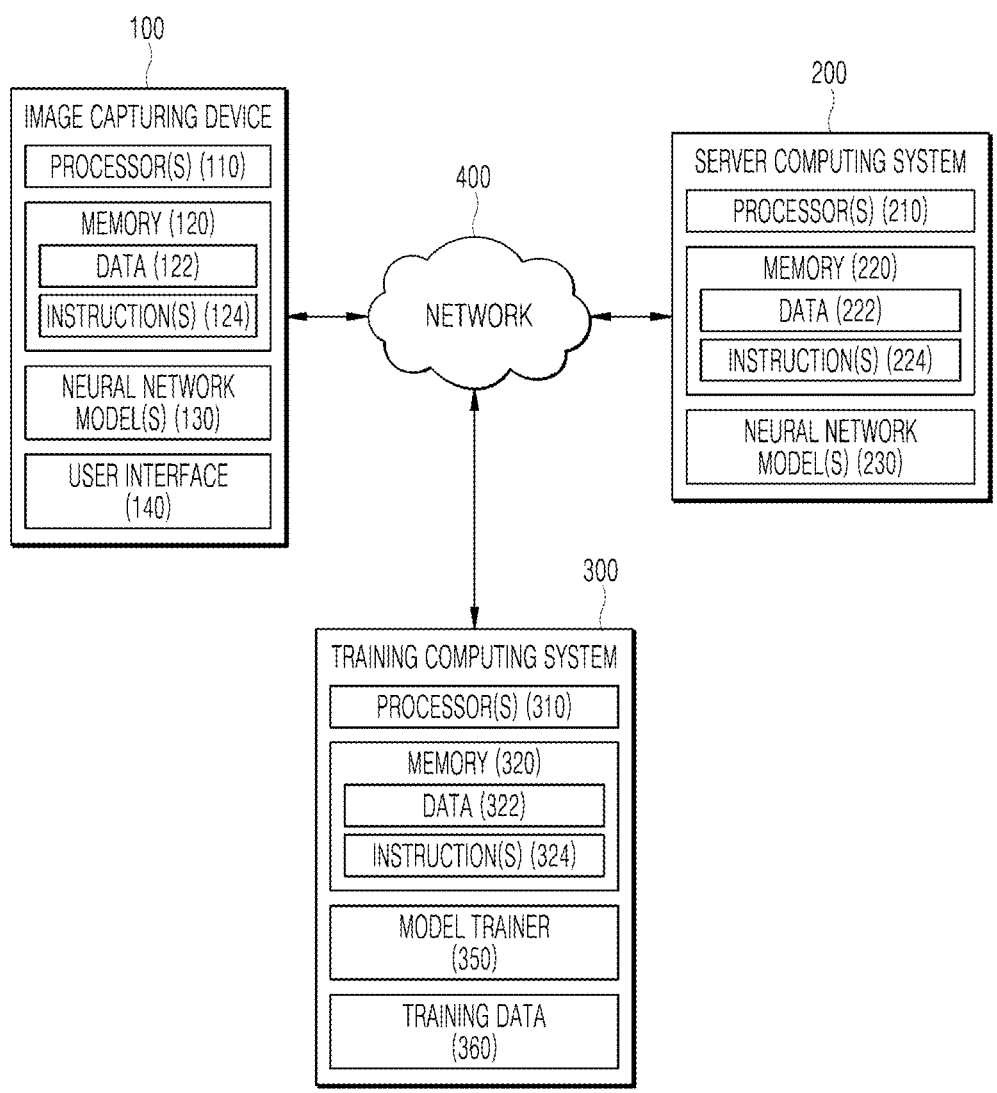
FIG. 1 is an example diagram of an environment for performing a method for collecting audio by moving a beam forming direction of a microphone toward an object in which audio is generated according to an embodiment of the present disclosure.

Hereinafter the embodiments disclosed in this specification will be described in detail with reference to the accompanying drawings. The present disclosure may be embodied in various different forms and is not limited to the embodiments set forth herein. Hereinafter in order to clearly describe the present disclosure, parts that are not directly related to the description are omitted. However, in implementing an apparatus or a system to which the spirit of the present disclosure is applied, it is not meant that such an omitted configuration is unnecessary. Further, like reference numerals refer to like elements throughout the specification.

In the following description, although the terms "first," "second," and the like may be used herein to describe various elements, these elements should not be limited by these terms. These terms may be only used to distinguish one element from another element. Also, in the following description, the articles "a," "an," and "the," include plural referents unless the context clearly dictates otherwise.

In the following description, it will be understood that terms such as "comprise," "include," "have," and the like are intended to specify the presence of stated feature, integer, step, operation, component, part or combination thereof, but do not preclude the presence or addition of one or more other features, integers, steps, operations, components, parts or combinations thereof.

FIG. 1 is an example diagram of an environment for performing a method for collecting audio by moving a beam forming direction of a microphone toward an object in which audio is generated according to an embodiment of the present disclosure;

As shown in FIG. 1, an environment for recognizing an object in which audio is generated and moving the beam forming direction of a microphone in a direction of the recognized object includes an image capturing device 100, a server computing system 200, a training computing system 300, and a network 400 that enables them to communicate with each other.

The image capturing device 100 may support object-to-object intelligent communication (such as Internet of things (IoT), Internet of everything (IoE), and Internet of small things (IoST), etc.), and may support communication such as machine to machine (M2M) communication and device to device (D2D) communication.

The image capturing device 100 may determine an image processing method using big data, artificial intelligence (AI) algorithms, and/or machine learning algorithms in a 5G environment connected for the Internet of things.

According to the image processing method, in an image captured by the image capturing device 100, the image is captured centering on an object having a high probability of generating audio. For example, while capturing images, sounds from objects with a high probability of generating audio, such as people, animals, and vehicles. are learned, and when a related object is captured, the beamforming direction of a microphone of the image capturing device 100 is shifted toward the object in which the audio is generated so that the user can capture the audio from the object in which the audio is generated without separately controlling the microphone.

The image capturing device 100 may be, for example, any kind of computing device, such as a personal computer, a smartphone, a tablet computer, a game console, and a wearable device. The image capturing device 100 may include one or more processors 110 and a memory 120.

The one or more processors 110 may include any type of device capable of processing data, such as an MCU. Herein, the term "processor" may refer to a data processing apparatus embedded in hardware, for example, having a circuit physically structured to perform a function represented by a code or an instruction contained in a program.

Examples of the data processing apparatus built in hardware may include a microprocessor, a central processing unit (CPU), a processor core, a multiprocessor, an application-specific integrated circuit (ASIC), and a field programmable gate array (FPGA), but the scope of the present disclosure is not limited to these examples.

The memory 120 may include one or more non-transitory storage media such as RAM, ROM, EEPROM, EPROM, flash memory devices, and magnetic disks. The memory 120 may store data 122, and instructions 124 for causing the image capturing device 100 to perform operations when executed by the processors 110.

In addition, the image capturing device 100 may receive commands from a user, including a user interface 140, and may transmit output information to the user. The user interface 140 may include various input means such as a keyboard, a mouse, a touch screen, a microphone, and a camera, and various output means such as a monitor, a speaker, and a display.

The user may select an image to be processed in the image capturing device 100 through the user interface 140. For example, the user may select an object to be captured through a mouse, a keyboard, or a touch screen. In addition, the user may generate a command to reduce or enlarge an image of a screen on which an image is captured by performing a pinch-in or pinch-out operation on the touch screen.

In one embodiment, the image capturing device 100 may store or include neural network models 130 to which artificial intelligence technology is applied. For example, the neural network models 130 to which the artificial intelligence technology is applied may be or include various learning models such as deep neural networks or other types of machine learning models.

Artificial intelligence (AI) is an area of computer engineering science and information technology that studies methods to make computers mimic intelligent human behaviors such as reasoning, learning, self-improving, and the like, or how to make computers mimic such intelligent human behaviors.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

Specifically, machine learning is a technology that investigates and constructs systems, and algorithms for such systems, which are capable of learning, making predictions, and enhancing their own performance based on experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

An ANN is a data processing system modeled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

Specifically, ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the ANN may include the synapse for connecting between neuron and neuron.

An ANN may be defined by the following three factors: (1) a connection pattern between neurons on different layers;

(2) a learning process that updates synaptic weights; and (3) an activation function generating an output value from a weighted sum of inputs received from a previous layer.

ANNs may include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

In general, a single-layer neural network may include an input layer and an output layer.

In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. The input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be a representative artificial neural network which enables deep learning, which is one machine learning technique.

An ANN may be trained using training data. Here, the training may refer to the process of determining parameters of the artificial neural network by using the training data, to perform tasks such as classification, regression analysis, and clustering of inputted data. Representative examples of parameters of the artificial neural network may include synaptic weights and biases applied to neurons.

An artificial neural network trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

The learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this situation, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a learning method that trains an artificial neural network to discover a pattern within given training data and perform classification by using the discovered pattern, rather than by using a correlation between given training data and labels corresponding to the given training data.

Examples of unsupervised learning may include clustering and independent component analysis.

Examples of artificial neural networks using unsupervised learning may include a generative adversarial network (GAN) and an autoencoder (AE).

A GAN is a machine learning method in which two different artificial intelligences, a generator and a discriminator, improve performance through competing with each other.

The generator may be a model creating new data that generate new data based on true data.

The discriminator may be a model recognizing patterns in data that determines whether inputted data is from the true data or from the new data generated by the generator.

Furthermore, the generator may receive and learn data that has failed to fool the discriminator, while the discriminator may receive and learn data that has succeeded in fooling the discriminator. Accordingly, the generator may evolve to fool the discriminator as effectively as possible, while the discriminator may evolve to distinguish, as effectively as possible, between the true data and the data generated by the generator.

An auto-encoder (AE) is a neural network which aims to reconstruct its input as output.

More specifically, an AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. In this situation, since the number of nodes in the output layer is greater than the number of nodes in the hidden layer, the dimensionality of the data increases, thus data decompression or decoding may be performed.

Furthermore, in the AE, the inputted data may be represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent may find an optimal path based on experience without reference to data.

Reinforcement learning may be performed primarily by a Markov decision process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

The hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. The one-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be used to minimize a cost function, and examples of such learning optimization algorithms may include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size. In the SGD, the momentum and NAG may also include methods that increase optimization accuracy by adjusting the step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network may include not only the structure and learning optimization algorithms of the artificial neural network but also the hyperparameters thereof. Therefore, in order to obtain a good learning model, it is important to choose a proper structure and learning algorithms for the artificial neural network, but also to choose proper hyperparameters.

In general, the hyperparameters may be set to various values experimentally to learn artificial neural networks, and may be set to optimal values that provide stable learning rate and accuracy of the learning result.

The neural network models 130, to which the artificial intelligence technology is applied as described above, may be first generated by the training computing system 300 through a training step, or may be stored in the server computing system 200 and then transmitted to the image capturing device 100 through the network 400.

The neural network models 130 may be neural networks capable of processing an image, and may be a trained model trained to recognize an object generating sound in an image and perform microphone beam forming toward the recognized object.

Typically, the neural network models 130 may be stored in the image capturing device 100 in a state in which images of objects from which audio has been generated and/or objects having a high probability of generating audio have mainly been captured, after the training has been completed. However, in some embodiments, the neural network models 130 may be updated after additionally being trained in the image capturing device 100.

Meanwhile, the neural network models 130 stored in the image capturing device 100 may be some of neural network models 130 generated by the training computing system 300, and new neural network models may be generated in the training computing system 300 and transferred to the image capturing device 100 as necessary.

As another example, the neural network models 130 may be stored in the server computing system 200 instead of being stored in the image capturing device 100, and provide functions which are necessary to the image capturing device 100 in the form of a web service.

The server computing system 200 includes processors 210 and a memory 220, and generally may have a larger processing capacity and a larger memory capacity than the image capturing device 100. Thus, depending on the system implementation, heavy neural network models 230 that require more processing power for application may be stored in the server computing system 200, and lightweight neural network models 130 that require less processing power for application may be stored in the image capturing device 100.

The image capturing device 100 may select an appropriate neural network model according to an attribute of an image to be processed among various neural network models 130. In one example, when lightweight neural network models 130 are required, the image capturing device 100 may be configured to use neural network models 130 stored in the image capturing device 100, and when heavyweight neural network models 130 are required, the image capturing device 100 may be configured to use neural network models 130 stored in the server computing system 200.

The neural network models 130 and 230 included in the image capturing device 100 or the server computing system 200 may be neural networks for processing images generated by the training computing system 300.

Figure 2:
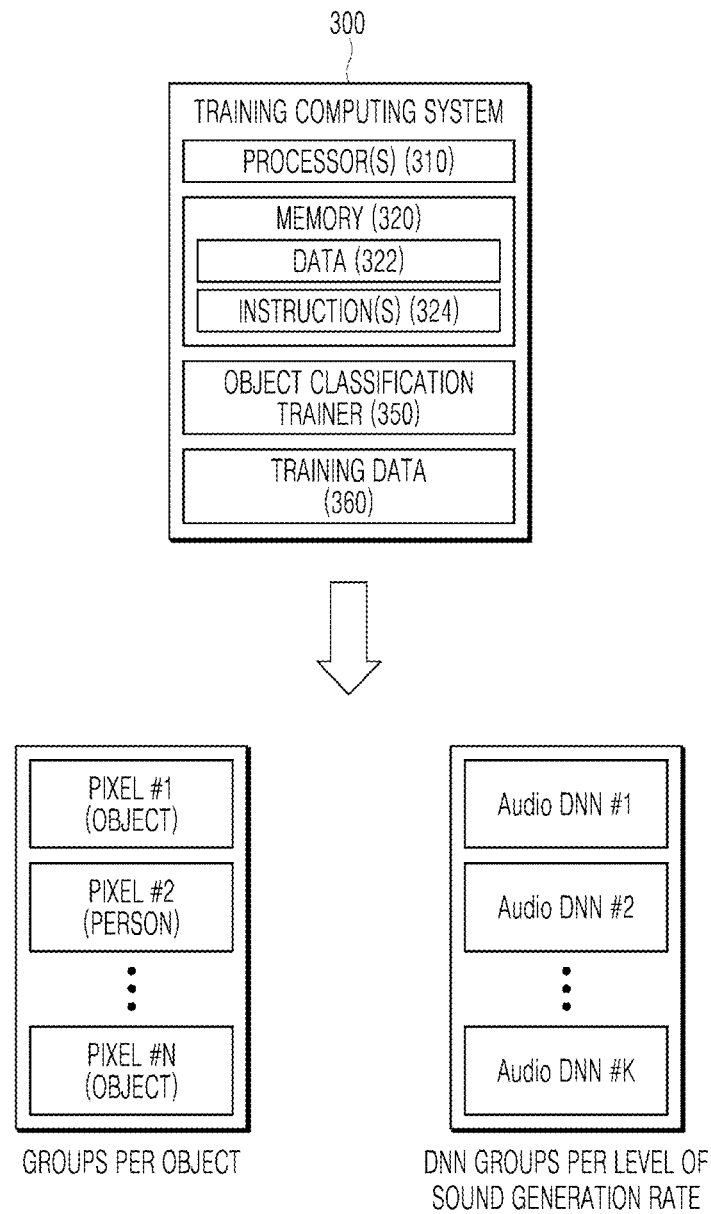
FIG. 2 shows a system for generating an object processing neural network according to an embodiment of the present disclosure.

FIG. 2 shows a system for generating an object processing neural network according to an embodiment of the present disclosure.

The training computing system 300 may include one or more processors 310 and a memory 320. The training computing system 300 may also include a model trainer 350 and training data 360 for training machine learning models.

The training computing system 300 may generate a plurality of neural network models based on the training data 360 through the model trainer 350.

For example, in a situation in which the training data 360 is an image labeled as "person," the training computing system 300 may determine that a person is an object with high probability of generating audio, and based on the determined result, a neural network model that moves the microphone's beamforming direction to be centered on the person can be generated.

On the contrary, in a situation in which the training data 360 is an image labeled as "text," the training computing system 300 may determine that there is a low probability of sound (audio) being generated in a text, and based on the determined result, a neural network model that prevents the microphone's beamforming direction from being moved may be generated for the text.

That is, the training computing system 300 may perform training with respect to moving the beam forming direction of the microphone to various objects that have a high probability of generating audio, such as a person, an animal, and a vehicle, and it is thus possible to generate an image processing neural network that enables an image to be captured while capturing the audio of such types of object.

In the above manner, the training computing system 300 may generate a neural network model group for each object. The neural network model group may include neural network models specialized to improve resolution of various object images, such as a human neural network model, an animal neural network model, and a vehicle neural network model.

Meanwhile, the training computing system 300 may generate a complex image processing neural network that requires longer processing time but provides improved performance, or may generate non-complex image processing neural network that takes a short time but provides low performance, depending on the initial configuration of neural network.

Here, the complexity of the image processing neural network is determined by the number of input nodes, the number of features, the number of channels, and the number of hidden layers, and it can be understood that the greater the number of features, the greater the number of channels, and the greater the number of hidden layers, the higher the complexity. Further, it can be said that the larger the number of channels and the larger the number of hidden layers, the heavier the neural network. In addition, the complexity of the neural network may be referred to as the dimensionality of the neural network.

The higher the complexity of the neural network, the better the image processing method may be, but the longer the time required for image processing may become. Conversely, the lighter the neural network, the lower the image resolution enhancement performance may be, but the shorter the time required for image processing may be.

Figure 3:
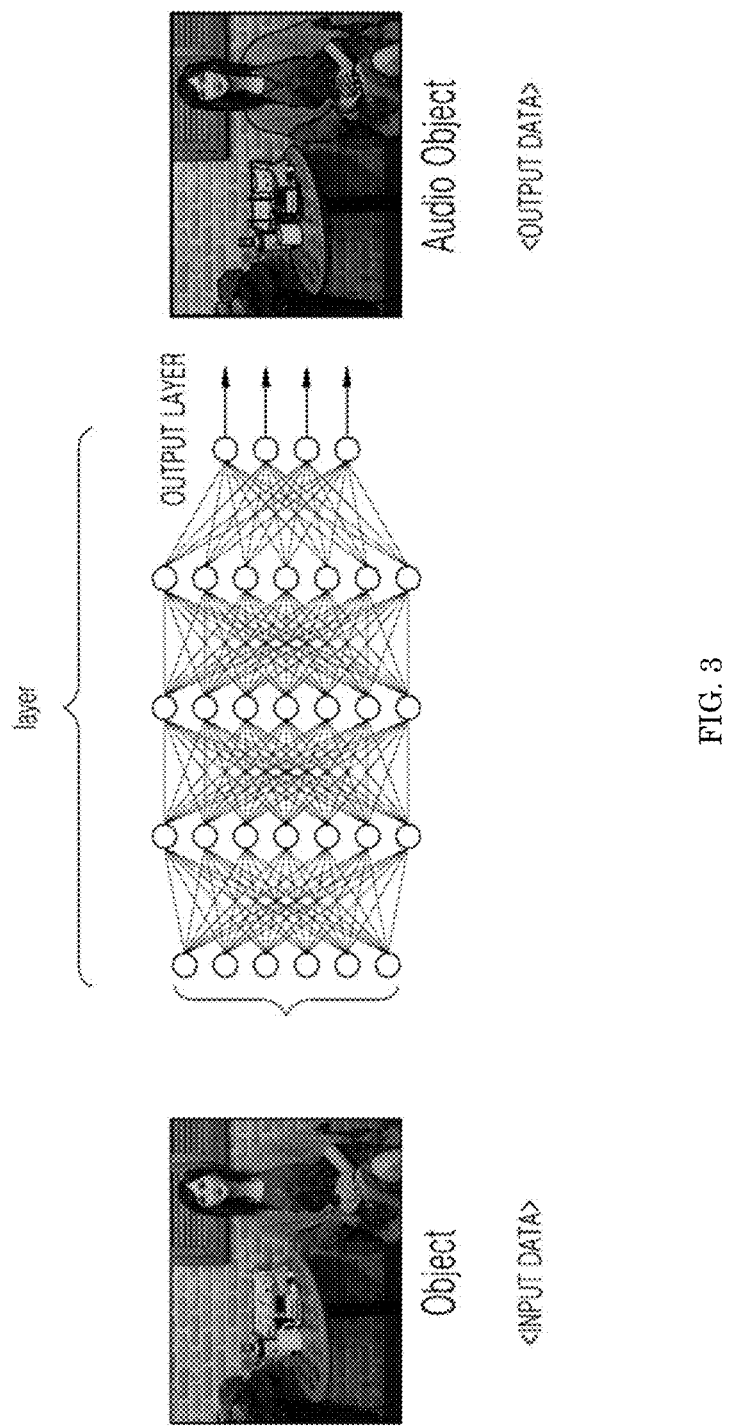
FIG. 3 is a diagram for describing an object processing neural network according to an embodiment of the present disclosure.

FIG. 3 is a diagram for describing an object processing neural network according to an embodiment of the present disclosure.

An image processing neural network may include an input layer, a hidden layer, and an output layer. The number of input nodes is determined according to the number of features, and as the number of nodes increases, the complexity or dimensionality of the neural network increases. In addition, as the number of hidden layers increases, the complexity or dimensionality of the neural network increases.

The number of features, the number of input nodes, the number of hidden layers, and the number of nodes in each layer can be determined by the designer of the neural network. As the complexity increases, a longer processing time is required but better performance may be shown.

Once the initial neural network structure is designed, training data can be used to train the neural network. In order to implement a neural network that can move the beam forming direction of the microphone based on an object in which audio is generated and/or an object with a high probability of generating audio, an original image of multiple objects and a classified version image in which the multiple objects have been classified according to whether they generate audio are needed.

Once the original image is collected, each type of object may be found in the image, the area of the object may be designated, and each type may be stored as a list.

If audio of the objects corresponding to such lists are connected with stored labels, when images are captured, training data for training a neural network for moving the microphone's beamforming direction to be directed toward an object in which audio is generated can be prepared.

At this time, if the neural network is trained using a large amount of training data by a supervised learning method, when an image including various objects is inputted, a neural network model through which the image can be captured while moving the microphone beam forming direction selectively among the various objects, or through which the image can be captured while moving the microphone beam forming direction toward the various objects, may be generated.

Here, if training data including people is used as the training data, an image processing neural network that is optimized for capturing images while moving the microphone beam forming direction to be centered on people may be obtained. In contrast, in a situation in which training data including logos and texts is used as training data, since logos and texts are objects with a low probability of generating audio, an image processing neural network that does not move the microphone beam forming direction during image capturing may be obtained.

Meanwhile, the processing speed and processing performance of the image processing neural network may be in a trade-off relationship. The designer may determine whether to improve the processing speed or the processing performance by changing the initial structure of the neural network.

The designer may set the structure of the neural network such that the direction of the microphone beam forming moves during image capturing in consideration of the type of the object, and may train the neural network. Accordingly, an image processing neural network that can be optimally used according to each type of object can be obtained.

Figure 4:
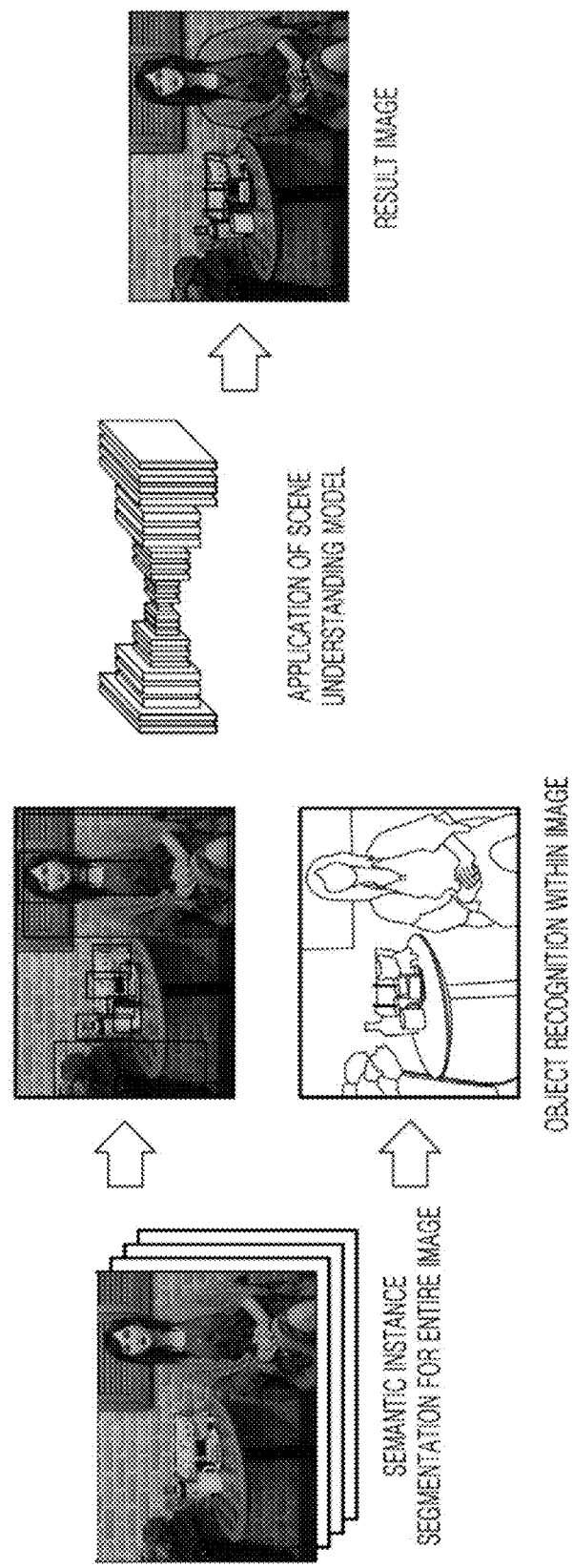
FIG. 4 is a diagram for describing an object determination method according to an embodiment of the present disclosure.

FIG. 4 is a diagram for describing an object determination method according to an embodiment of the present disclosure.

Referring to the drawing, as a method for determining an object in an image, first, a plurality of objects in the captured image are recognized. At this time, the image processing neural network is used to find not only previously learned objects but also unlearned types of object in the captured image.

In addition, the types of respective objects may be found to recognize the boundary of the objects in the captured image, the area of the objects may be designated, and each type may be stored as a list.

At this time, the movement of each of the one or more objects is recognized using image data for a predetermined time in the image data. For example, the movement of objects in the image is recognized through image data of 1 to 3 seconds.

Then, the correlation between the movement of each object and audio data is estimated for the predetermined time in the image data. That is, it is estimated which object the audio generated in the image during the 1 to 3 seconds is related to.

In summary, objects classified by areas can be classified according to the movement and whether sound is generated. In addition, when audio is generated in voice data accumulated for a predetermined time, the movement of the object, which corresponds to a change in the previously designated area, may be recognized, and it may be estimated whether the movement is related to movement in which the audio is generated.

To this end, based on a scene understanding neural network, it is possible to estimate which of the objects is associated with the audio generated in the image.

The scene understanding neural network may be understood as a training model trained to probabilistically estimate the generation of audio according to a movement included in a scene. That is, when the moving object in the image is a chair, the probability of generating audio of the chair may be estimated based on learned conditions.

In this situation, when the moving object in the image is a dog or a person, the probability of generating audio may be estimated to be high according to the learned conditions. When the moving object in the image is an object such as a chair or a desk, the probability of generating audio may be estimated to be low.

Further, when estimating whether a movement in the image is related to movement in which audio is generated, a relationship between the objects in the frames of the image may be estimated to match generated audio with the object having a high probability of generating audio, or match the object movement with the audio data.

In more detail, regarding such matching, an object in the frames of the image may be a chair, and audio data extracted from the image data may be the sound of the chair moving. In this situation, when learned chair movement sound information matches the sound of the chair moving in the image, it may be determined the object in the frame of the image is a chair, and the sound is a sound generated by the chair, and thus it may be determined that the first object is a chair.

Alternatively, objects in the image may include a park, a dog, a tree, and the like. The sound of a dog is learned in the data training process, and in a state in which it has been learned that a dog is an object having a high probability of generating audio, if the user does not indicate a specific object in the image, the microphone may change the microphone beam forming direction to be directed toward the dog.

That is, as a result of learning, since the object "dog" is more likely to generate audio than an object such as a park or a tree, the dog is set as the first object, and the microphone is configured to receive audio centered on the dog.

FIGS. 5 to 8 are diagrams for explaining microphone beam forming of an object according to an embodiment of the present disclosure.

As described above, objects in an image may be recognized, and only objects having a probability of generating audio among the recognized objects may be extracted as subjects of audio zoom-in and movement of the microphone beamforming direction.

Figure 5:
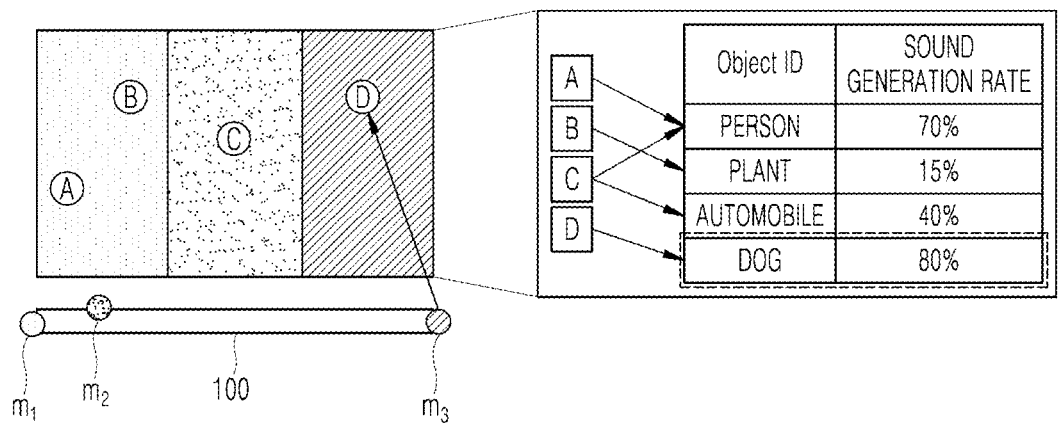
FIGS. 5 to 8 are diagrams for explaining microphone beam forming of an object according to an embodiment of the present disclosure.
Figure 6:
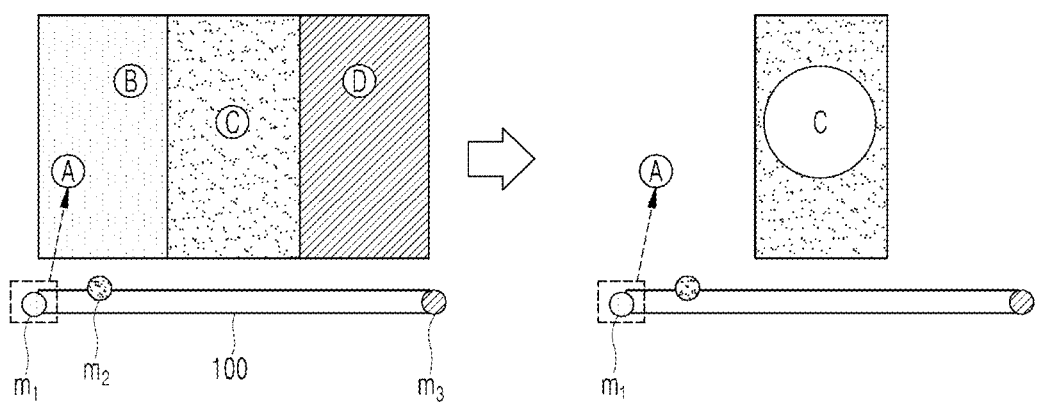

Referring to FIG. 5, when the mode of the image capturing device 100 is changed to an image capturing mode, the camera included in the image capturing device 100 captures an image of objects intended to be captured.

Among the captured objects, only objects having a high probability of generating audio may be extracted from a video and/or an image captured by the camera. For example, if the objects captured by the image capturing device 100 are a person A, a plant B, an automobile C, and a dog D, the person A and the dog D may be determined as having a high probability of generating audio, and may be extracted.

The beam forming direction of the microphone is moved toward the dog D, which is the first object having the highest probability of generating audio, and the image capturing device 100 may capture images.

In particular, when the microphone beam forming direction is moved toward the dog D, which is the first object, the beam forming direction of a microphone adjacent to the dog D may be set to be moved. For example, the image capturing device 100 may include a plurality of microphones (for example, three microphones). As shown in the figure, it may be assumed that the plurality of microphones are a first microphone m1, a second microphone m2, and a third microphone m3. At this time, when it is determined that the third microphone m3 is positioned closest to the dog D, the beamforming direction of the microphone m3 is set to be moved to be directed toward the dog D.

Alternatively, an object designated by the user may be designated as the first object. As described above, among the captured objects, only objects having a high probability of generating audio may be extracted from the video and/or the image captured by the camera. In this situation, among the objects captured by the image capturing device 100, the person A and the dog D may be determined and extracted as objects having a high probability of generating audio.

In this situation, when the user designates the object person A, the person A is determined to be the first object, and the microphone beam forming direction is moved toward the person A. In this situation, since the person A is in a position adjacent to the first microphone m1, the microphone beam forming direction of the first microphone m1 may be moved.

Here, the method of designating the first object by the user may be specified by touching the image capturing screen of the image capturing device 100 or by zooming in on the first object by using a finger. In addition, the method of designating the first object may be changed depending on conditions.

Meanwhile, in a state in which the user has designated the person A as the first object, the person A may deviate from the image capture range of the image capturing device 100. This means that, for example, the user has either moved the image capturing device 100 or the focus has been changed.

Even when the first object designated by the user deviates from the image capture range of the image capturing device 100, the microphone beam forming direction directed toward the first object may be maintained. That is, referring to FIG. 6, when the microphone beam forming direction of the first microphone m1 is moved toward the person A, which is the first object designated by the user, the image capture range of the image capturing device 100 may be changed and the image capturing device 100 may capture an image of the object vehicle C. Even in this situation, since the user has not changed the designation of the first object, priority is given to capturing audio of the first object.

As a result, since the user can capture the audio centered on the first object desired by the user, it is possible to prevent deterioration of efficiency in using the microphone beam forming.

On the contrary, the user may zoom in the image capturing screen of the image capturing device 100 without designating the first object. The zoom-in of the user may mean selecting an object to be focused in the image capturing screen of the image capturing device 100.

Here, the user executes the zoom-in action, determines that the object in the zoomed-in screen is the first object, and allows the microphone beam forming direction for capturing audio of the object in the zoomed-in screen to be moved.

In this situation, even if the user performs the zoom in action, the object may not be present in the zoomed-in screen. In this situation, it may be desirable not to change the microphone beamforming direction, to capture audio of an object in which the microphone beam forming direction has previously been set.

As described, the image capturing device 100 may include a plurality of microphones. In this situation, there may be a plurality of objects determined as the first object, and audio may be collected from the plurality of first objects.

Figure 7A:
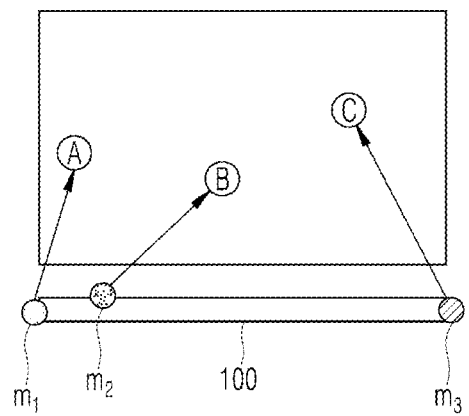

In this situation, as shown in FIG. 7A, the microphone beam forming direction of each of the plurality of microphones may be set to be directed toward the first object that is closest to the corresponding microphone among the plurality of first objects.

Figure 7B:
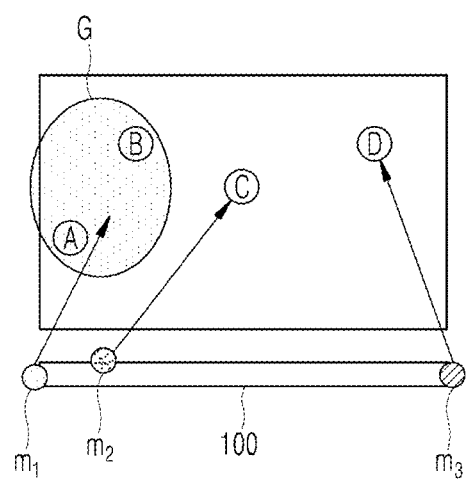
Figure 7C:
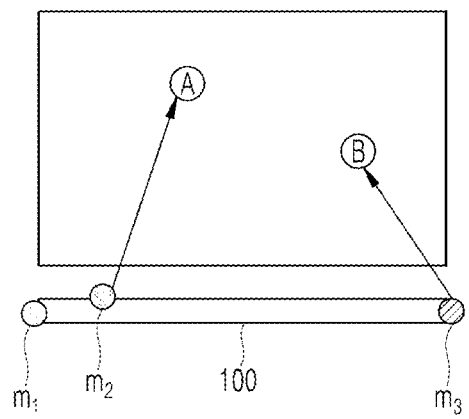

In this situation, as shown in FIG. 7A and FIG. 7C, when the number of the plurality of first objects and the number of microphones correspond to each other, audio generated from each of the first objects may be collected by each of the microphones.

For example, when it is determined that the first microphone m1 is closest to the object person A, the first microphone m1 may be set to collect audio of the object person A. Similarly, when it is determined that the second microphone m2 is closest to the object plant B, the second microphone m2 may be set to capture audio of the object plant B, and when it is determined that the third microphone m3 is closest to the object vehicle C, the third microphone m3 is set to capture audio of the object vehicle C.

Alternatively, when there are a plurality of objects determined as the first object and the number of the first objects is larger than the number of microphones of the image capturing device 100, different first objects located within a predetermined distance from each other may be grouped (G), and the audio generated in the grouped (G) group may be collected through any one of the microphones of the image capturing device 100.

For example, as shown in FIG. 7B, when there are four first objects and it is determined that the object A and the object B are adjacent objects, the object A and the object B are created as one group G. Upon a determination that the microphone closest to the group G is the first microphone m1, the audio generated in the group G is set to be captured by the first microphone m1.

In this situation, in the embodiment of the present disclosure, an example of grouping adjacent objects is described, but objects of similar types (for example, people or animals) may be grouped in order to minimize mixed capturing of the audio of different types of objects.

As a result, even when there are a plurality of objects having a high probability of generating audio, the plurality of microphones are set to capture audio generated from their respective objects. Accordingly, the audio generated from the plurality of objects can be captured without omission.

Meanwhile, audio capturing of the first object may be performed by an external microphone Bm instead of a microphone of the image capturing device 100.

Figure 8:
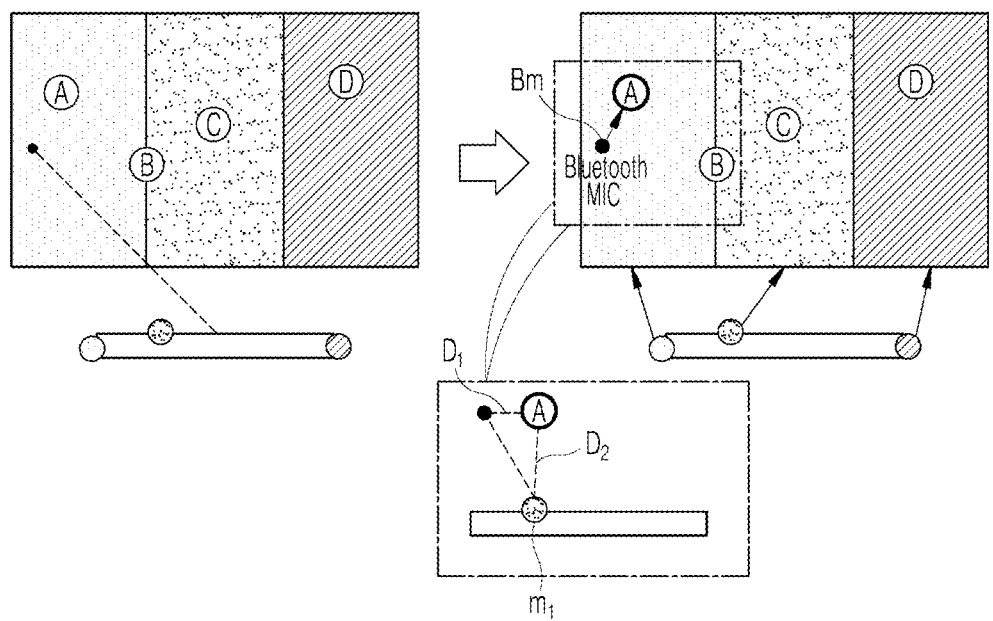

That is, as shown in FIG. 8, it may be determined that the external microphone Bm is located between the objects in a state in which the first object having a high probability of generating audio has been determined among the objects.

For example, the external microphone Bm may be a Bluetooth microphone, and the Bluetooth microphone may be communicatively connected to a communication interface of the image capturing device 100. When communication with the Bluetooth microphone is established, a notification window indicating connection with the external microphone Bm is shown in the image of the image capturing device 100, and it can thereby be determined whether there is an external microphone Bm.

Subsequently, the distance between the microphone of the image capturing device 100 and the first object and the distance between the external microphone Bm and the first object are measured. Based on the measured distances, the microphone located closer to the first object is selected, and audio capture is enabled for the selected microphone.

For example, in a situation in which the first object is the object A, if the distance between the object A and the external microphone Bm is shorter than the distance between the object A and the microphone of the image capturing device 100, the audio of the object A is captured from the external microphone Bm.

In this situation, the external microphone Bm and the image capturing device 100 include an input and an output interface, and audio of the object A captured by the external microphone Bm may be transmitted to the image capturing device 100.

Here, the method for measuring the distance between the microphone of the image capturing device 100 and the first object and the distance between the external microphone (Bm) and the first object may be explained via an example in which times of capturing the audio generated from the same object by the external microphone (Bm) and the microphone of the image capturing device 100 are respectively measured, and it is determined that the device having a shorter measured time is closer to the object.

As such, an object having a high probability of generating sound is determined as a first object, and the microphone beamforming may be moved to be centered on the determined first object to more accurately capture the audio of the first object.

Figure 9:
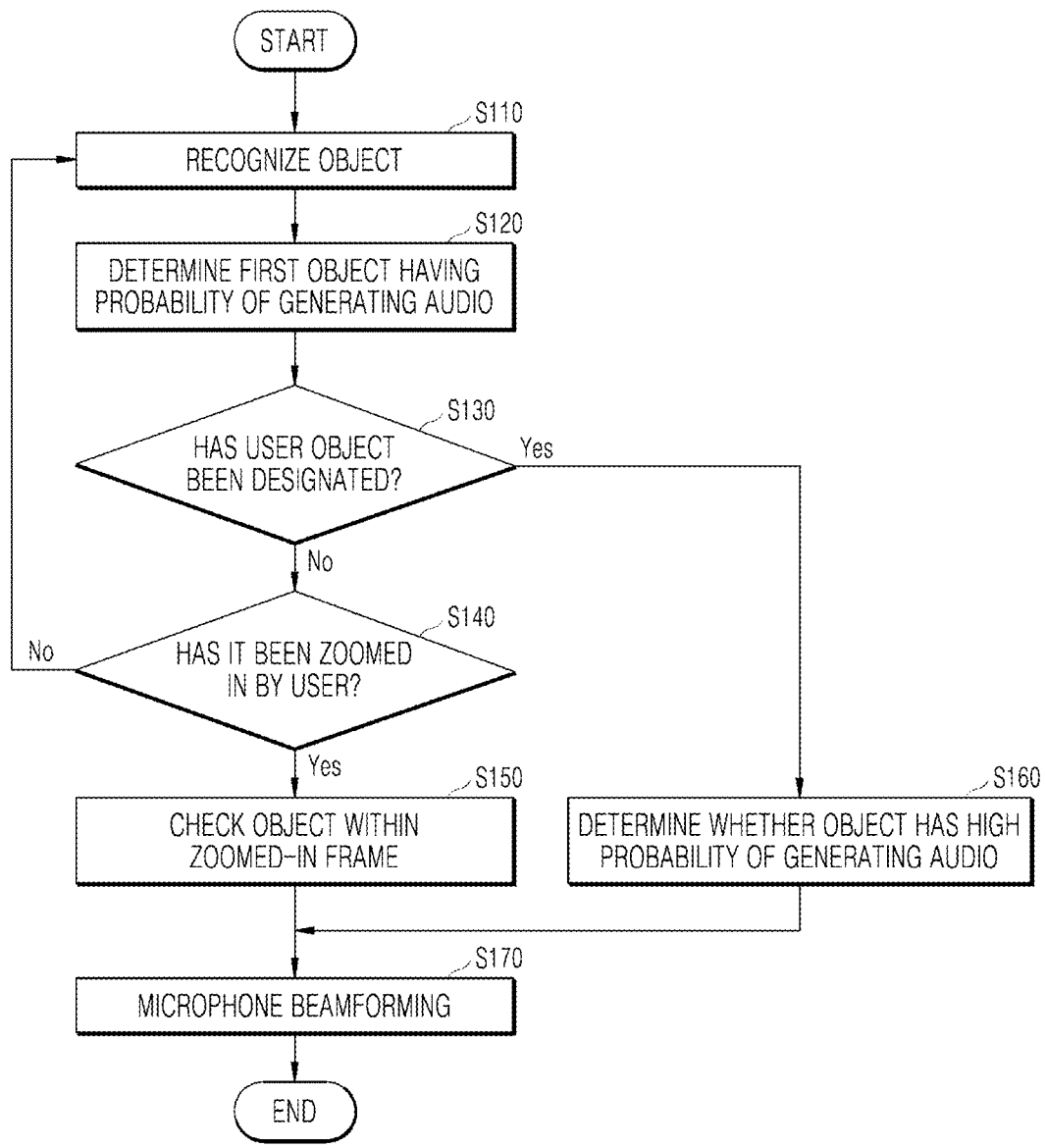
FIG. 9 is a flowchart illustrating a microphone beam forming method of an object according to an embodiment of the present disclosure.

FIG. 9 is a flowchart illustrating a microphone beam forming method of an object according to an embodiment of the present disclosure.

Referring to the drawing, in the microphone beam forming process, first, one or more objects may be recognized on the screen of the image capturing device 100 (S110). Here, the one or more objects may be any of a person, an animal, a plant, and a thing (for example, a car).

If a plurality of objects are recognized, the objects may be classified according to whether audio is generated according to the type of the object. Alternatively, the probability of generating audio according to the type of object may be measured and listed in order of objects having a high probability of generating audio.

By classifying the objects according to type or listing the objects according to the probability of generating audio of the objects, it can be determined whether the user has designated the object (S120).

The user designating an object may mean that the user directly designates a specific object in the video screen by touching or clicking thereon, or alternatively that the user zooms in on a part of the screen to be captured so that that the image is captured such that a specific object becomes the center of the image.

Upon a determination that the user has designated an object, in particular, when the user zooms in on the captured video screen, the object shown in the zoomed-in area may be checked (S130 and S140).

When checking the object shown in the zoomed-in area, it is determined whether the object shown in the zoomed-in area is an object with a high probability of generating audio, and in response to a determination that the object is a first object with a high probability of generating audio, the microphone beam forming direction may be moved toward the first object, to thereby capture the audio of the first object (S150, S170).

In addition, when the user selects the first object by designating the object, it is determined whether the selected first object is an object with a high probability of generating audio, and the microphone beam forming direction is then moved toward the selected first object to thereby capture the audio of the first object (S160 and S170).

In this situation, since the user has designated the first object for audio collection, it may be preferable not to stop audio collection of the first object even when the probability of generating audio of the first object designated by the user is low.

As described above, when a user desires to acquire audio of an object which has been zoomed in on during image capturing, by selecting an object with a high probability of generating audio and moving the microphone beamforming direction toward the object with a high probability of generating audio, it is possible to accurately capture of the sound of the object with a high probability of generating audio.

In addition, even when the position where the zoom-in is performed does not match with the direction of the object where the sound is generated while capturing images, the sound collection of an object with a high probability of generating audio can be performed.

In addition, even when there are a plurality of objects having a high probability of generating sound, as the audio of each object is captured by using the plurality of microphones included in the image capturing device 100, the capture of the audio generated in the plurality of objects may be performed without omission.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of computer programs may include both machine codes, such as produced by a compiler, and higher-level codes that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. Also, the steps included in the methods according to the present disclosure may be performed through the processor or modules for performing the functions of the step. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various modifications, combinations, and alternations can be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

The present disclosure described as above is not limited by the aspects described herein and accompanying drawings. It should be apparent to those skilled in the art that various substitutions, changes and modifications which are not exemplified herein but are still within the spirit and scope of the present disclosure may be made. Therefore, the scope of the present disclosure is defined not by the detailed description, but by the claims and their equivalents, and all variations within the scope of the claims and their equivalents are to be construed as being included in the present disclosure.

What is claimed is:

1. A method of controlling audio collection for an image capturing device, the method comprising:
receiving image data from an image capturing device;
recognizing one or more objects from the image data;
determining a first object having a possibility of generating audio among the one or more objects; and
collecting audio from the first object by moving a microphone beamforming direction of the image capturing device to be directed toward the first object in response to a determination that the first object is an object having a possibility of generating audio,
wherein the determining of the first object further comprises:
determining an object designated by a user among the one or more objects as the first object; and
in response to the object designated by the user being excluded from an image capture range of the image capturing device, maintaining the microphone beamforming direction to be directed toward the object designated by the user even though the object designated by the user is no longer included within the image capture range of the image capturing device.

2. The method of claim 1, wherein the moving of the microphone beamforming direction includes moving at least one microphone in an array of microphone within the image capturing device toward the first object.

3. The method of claim 1, wherein the moving of the microphone beamforming direction includes moving at least one external microphone external to the image capturing device toward the first object.

4. The method of claim 1, wherein the recognizing of the one or more objects is based on an object classification neural network, and
wherein the object classification neural network is a neural network model trained in advance using training data in which types of a plurality of objects are labeled in images of the plurality of objects.

5. The method of claim 1, wherein the determining of the first object comprises:
recognizing a movement of the one or more objects based on image data collected over a predetermined time period from among the image data; and
estimating an association between audio data corresponding to the predetermined time period and the movement of the one or more objects based on estimating a probability that the movement will generate audio according to a scene understanding neural network.

6. The method of claim 1, wherein the determining of the first object further comprises extracting only objects from among the one or more objects having a probability of generating audio that is equal to or greater than a predetermined threshold to be subjects for audio zoom-in.

7. The method of claim 1, wherein the image capturing device comprises a plurality of microphones,
wherein a plurality of objects are determined as the first object, and
wherein the collecting of the audio from the first object comprises directing each of the plurality microphones toward a corresponding closest object among the plurality of objects.

8. The method of claim 7, wherein the collecting of the audio from the first object further comprises:
in response to determining a number of the plurality of objects is greater than a number of the plurality of microphones, grouping objects located at a distance equal to or less than a predetermined threshold distance from one of the plurality of microphones, from among the plurality of first objects, into a first group.

9. A method of controlling audio collection for an image capturing device, the method comprising:
receiving image data from an image capturing device;
recognizing one or more objects from the image data;
determining a first object having a possibility of generating audio among the one or more objects; and
collecting audio from the first object by moving a microphone beamforming direction of the image capturing device to be directed toward the first object in response to a determination that the first object is an object having a possibility of generating audio,
wherein the collecting of the audio from the first object further comprises:
determining an external microphone disposed adjacent to the first object;
measuring a first distance between a microphone of the image capturing device and the first object;
measuring a second distance between the external microphone and the first object; and
selecting a closest microphone located closest to the first object from among the microphone of the image capturing device and the external microphone.

10. An image capturing device for controlling audio, the image capturing device comprising:
one or more processors; and
a memory connected to the one or more processors,
wherein the memory stores one or more instructions configured to, when executed by the one or more processors, cause the one or more processors to:
receive image data,
recognize one or more objects from the image data,
determine a first object having a possibility of generating audio among the one or more objects, and
collect audio from the first object by moving a microphone beamforming direction of the image capturing device to be directed toward the first object in response to a determination that the first object is an object having a possibility of generating audio,
wherein the one or more instructions are further configured to cause the one or more processors to:
determine an object designated by a user among the one or more objects as the first object, and
in response to the object designated by the user being excluded from an image capture range of the image capturing device, maintain the microphone beamforming direction to be directed toward the object designated by the user even though the object designated by the user is no longer included within the image capture range of the image capturing device.

11. The image capturing device of claim 10, wherein the one or more instructions are further configured to cause the one or more processors to:
recognize the one or more objects included the image data based on an object classification neural network, wherein the object classification neural network is a neural network model trained in advance using training data in which types of a plurality of objects are labeled in images of the plurality of objects.

12. The image capturing device of claim 10, wherein the one or more instructions are further configured to cause the one or more processors to:

recognize a movement of the one or more objects based on image data collected over a predetermined time period from among the image data, and estimate an association between audio data corresponding to the predetermined time period and the movement of the one or more objects based on estimating a probability that the movement will generate audio according to a scene understanding neural network.

13. The image capturing device of claim 10, wherein the one or more instructions are further configured to cause the one or more processors to:

extract only objects from among the one or more objects having a probability of generating audio equal to or greater than a predetermined threshold to bet subjects of audio zoom-in.

14. The image capturing device of claim 10, wherein the image capturing device further comprises:

a plurality of microphones, wherein a plurality of objects are determined as the first object, and wherein the one or more instructions are further configured to cause the one or more processors to:

direct each of the plurality microphones toward a corresponding closest object among the plurality of objects.

15. The image capturing device of claim 14, wherein the one or more instructions are further configured to cause the one or more processors to:

in response to determining a number of the plurality of objects is greater than a number of the plurality of microphones, group objects located at a distance equal to or less than a predetermined threshold distance from one of the plurality of microphones, from among the plurality of first objects, into a first group.

16. An image capturing device for controlling audio, the image capturing device comprising:

one or more processors; and a memory connected to the one or more processors, wherein the memory stores one or more instructions configured to, when executed by the one or more processors, cause the one or more processors to:

receive image data, recognize one or more objects from the image data, determine a first object having a possibility of generating audio among the one or more objects, and collect audio from the first object by moving a microphone beamforming direction of the image capturing device to be directed toward the first object in response to a determination that the first object is an object having a possibility of generating audio, wherein the one or more instructions are further configured to cause the one or more processors to:

determine an external microphone disposed adjacent to the first object, measure a first distance between a microphone of the image capturing device and the first object, measure a second distance between the external microphone and the first object, and select a closest microphone located closest to the first object from among the microphone of the image capturing device and the external microphone.

* * * * *